Figure 1:
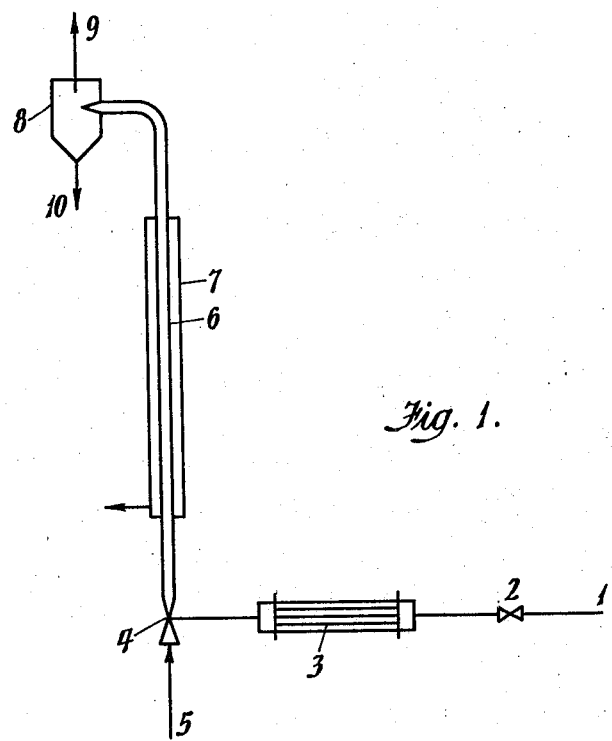

Dec. 20, 1966   L. S. HERBERT ET AL   3,293,152
METHOD FOR PREVENTING SCALE DEPOSITION
Filed Aug. 14, 1963   2 Sheets-Sheet 1

United States Patent Office 3,293,152
Patented Dec. 20, 1966

3,293,152
METHOD FOR PREVENTING SCALE DEPOSITION
Leonard Sidney Herbert, Mount Waverley, Victoria, and Uldis Jekabs Sterns, Cheltenham, Victoria, Australia, assignors to Commonwealth Scientific and Industrial Research Organization, East Melbourne, Victoria, Australia, a corporation of Australia
Filed Aug. 14, 1963, Ser. No. 302,059
Claims priority, application Australia, Aug. 20, 1962, 21,150/62, Patent 261,222
6 Claims. (Cl. 203—7)

This invention relates to methods for preventing the formation of scale in distillation and evaporation apparatus, and the like.

The formation of hard mineral deposits, known as "scale," on the heat transfer surfaces of boilers, evaporators and distillers is well known. The deleterious effects of such scales on the heat transfer and pressure drop in such apparatus have been of major concern to their users, and many methods of alleviating or preventing scale formation have been tried.

With stills in common use, the distillation of sea water and other water containing dissolved calcium and magnesium salts produces scale on the heat transfer surfaces, which increases the resistance to heat flow and so results in reduced production rates and increased operating costs. The effect can be decreased by the continuous use of chemical additives which minimise scale formation, and/or by limiting the temperature of evaporation, but even so the heat transfer surfaces usually have to be designed to facilitate cleaning and removal of scale, rather than to permit good heat transfer. Such corrective or preventative measures result in bulky equipment with low rates of distillation; for example, the temperature limitation gives rise to low thermal efficiency and limits the gain in output ratio obtained in multi-effect evaporation.

Thus, in sea water distillation, the upper brine temperature is limited to around 200° F. and the concentration factor to around 3.0 by scaling considerations, even when presently known antiscaling chemical additives are added. Many other industries, e.g. distilleries, salt manufacturing, sugar evaporation and steam raising installations, etc., have similar problems which cause great difficulties in the design and operation of plant.

Recently, several techniques have been evolved to enable intermittent removal of scale from the heat transfer surfaces of sea-water evaporators. Some of these techniques are described in our co-pending applications Nos. 13,303/62 and 13,304/62. Intermittent operation is not always possible or desirable, but both techniques suffer from this disadvantage. Our co-pending application No. 15,688/62 describes a process for the pretreatment of heat transfer surfaces with anti-scaling substances, but in this case the effect of the treatment is not permanent, and the pretreatment must be repeated at intervals, with the disadvantage that the apparatus must be then shut down.

In view of the foregoing, it is the main object of this invention to provide a method for preventing the formation of scale which can be carried out continuously and without any shut-down of the apparatus or discontinuity of operation.

The present invention provides a method of preventing the formation and/or build-up of adherent scale deposits on the heat transfer surfaces of apparatus used for the distillation or evaporation of aqueous liquor, which comprises the addition to the aqueous liquor of an organic polymer capable of forming at the heat transfer surfaces, under the conditions of operation of the apparatus, a film or sheath which either excludes the scale from the heat transfer surfaces or is co-deposited with the scale, the said film or sheath increasing to a critical thickness whereupon it breaks away from the said surfaces to leave the same substantially free from scale. The film is redeposited on the clean surface and again breaks away, the overall effect being that the heat transfer surfaces are automatically maintained substantially free of scale and thus there is a negligible effect on heat transfer rates or on pressure drops. Such a film will be referred to hereinafter as a "regenerating self-stripping film."

A suitable additive is polyacrylic acid. The molecular weight of the polymer is of importance in producing a film which is capable of breaking away from the surface, and we have found that polyacrylic acid having a molecular weight of about 20,000 is particularly effective. The invention is, however, not limited to the use of this additive, as other suitable organic polymers may be used in place of polyacrylic acid.

Based on present experience, the method of the invention is capable of preventing the formation and/or build-up of several types of scale during the evaporation of scaling solutions up to a temperature of at least 250° F.

Figure 2:
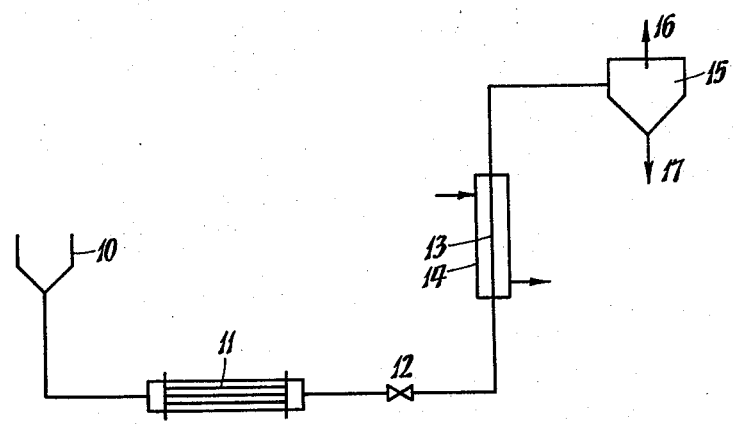
Figure 3:
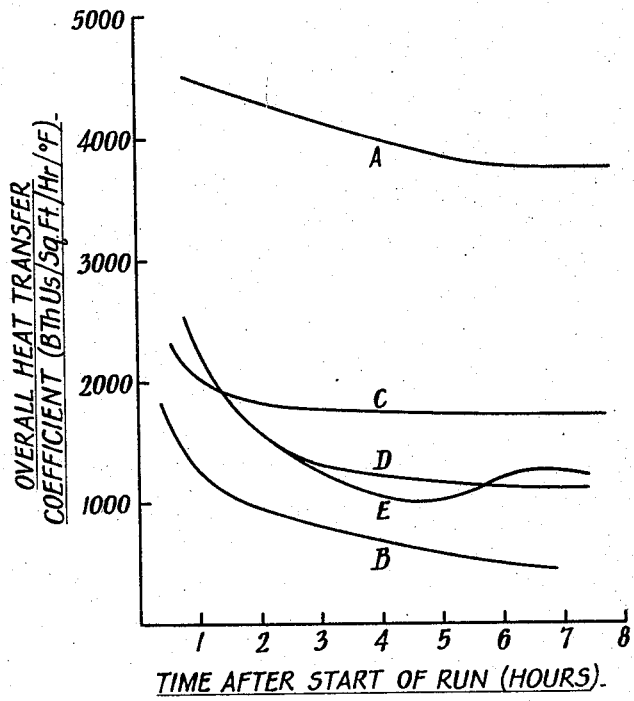
Figure 4:
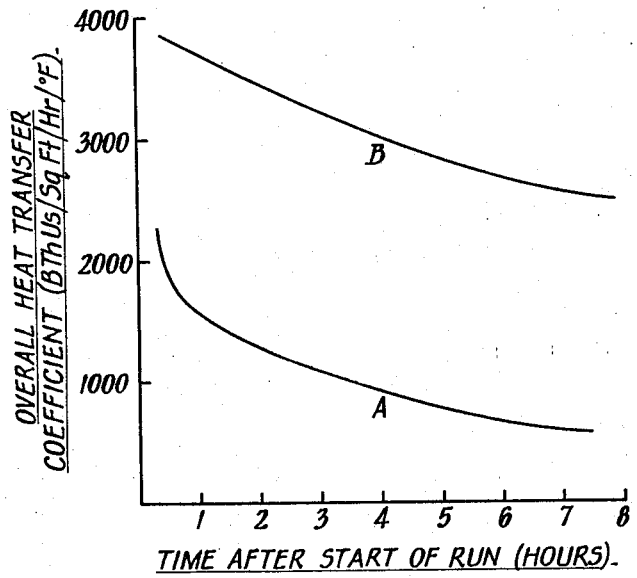

Practical examples of the method according to this invention will now be described with reference to the accompanying drawings in which:

FIGURE 1 is a diagrammatic representation of a spray evaporation apparatus and of a flow-sheet of a sea water distillation process in accordance with the invention, FIGURE 2 is a diagrammatic representation of a "climbing film" evaporator and of a flow-sheet of a sea water distillation process in accordance with the invention, FIGURE 3 is a graph showing the results obtained from the apparatus and process illustrated in FIGURE 1, and FIGURE 4 is a graph showing the results obtained from the apparatus and process illustrated in FIGURE 2.

In the apparatus of FIGURE 1, sea water or other water containing dissolved magnesium salts is pumped from 1 through an on-off valve 2 to a preheater 3 in which it is preheated to near its boiling point. The hot saline water is then pumped into a steam-water mixer 4 of any suitable type, for example a Venturi throat, in which it is intimately mixed with a small amount of entrainment steam 5. From the mixer 4, the resulting mixture of steam and entrained saline water droplets moves rapidly into an evaporator tube 6 which is made of highly conductive metal, e.g. copper, and is heated on the outside by means of a steam jacket 7. Previous application of a dropwise condensation promoter, such as oleic acid or dodecanethiol, to that part of the outside of the tube which lies inside the steam jacket is advantageous in giving a high outside condensing film coefficient and therefore better heat transfer.

Evaporation occurs in the tube 6, and the resulting mixture of steam and "thick liquor" (saline concentrate) is separated in a cyclone separator 8 or other suitable separator, the steam 9 being condensed in a condenser or heat exchange equipment to form the distillate. The "thick liquor" 10 is run to waste or further evaporated.

In the process described, the rate of heat transfer in the evaporator tube remains at an initial, high value only for a period of some minutes, i.e. while the inner surface of the evaporator tube remains substantially clear. However, thereafter the rate of heat transfer falls off very rapidly due to the formation of a gelatinous scale, probably strongly hydrated magnesium hydroxide, on the inner surface of the evaporator tube.

Example I

In an application of the method of the invention, 3 p.p.m. of polyacrylic acid, having a molecular weight of about 20,000, were added as a 60% solution in isopropanol to a quantity of sea water and thoroughly mixed. The sea water was then subjected to distillation in the above described spray evaporation apparatus. After 50 hours operation, in which time 1,500 gallons of sea water were passed through the apparatus and some 350 gallons of pure water were evaporated at a temperature of 240° F., the heat transfer coefficient decreased only slightly from an initial value of about 3,500 to a final value of 2,500 B.t.u.'s/sq. ft. hr. ° F. Examination of the inner evaporator heat transfer surfaces after the run, showed that a thin plastic film was present on the clean metal surface, which on air-drying peeled off in thin whiskery threads to reveal a bright clean metal surface with no trace of scale deposit. In all other tests on sea water carried out in the same apparatus but without the use of additives in accordance with the invention, the heat transfer coefficient fell from an initial value of about 3500–4000 B.t.u.'s/sq. ft. hr. ° F. to about 800 or less after only 8 hours evaporation. Examination of the tube after operation, always revealed extensive scaling of $Mg(OH)_2$, $CaCO_3$ or combinations of these compounds

Example II

The curves A through E in FIGURE 3 represent a plot of the overall heat transfer coefficient with respect to time, and show graphically the results obtained for a series of 8 hour runs, in which sea water was evaporated in the apparatus of FIGURE 1. The initial (i.e. zero time) values of the heat transfer coefficient cannot be measured accurately and no attempt has been made to extrapolate the curves back into this region. It is believed however, that the initial value of the coefficient is substantially the same in all cases, i.e. between 4000 and 5000 B.t.u.'s/sq. ft. hr. ° F. Curve A shows the effect on the overall heat transfer coefficient, when 3 p.p.m. of polyacrylic acid having a molecular weight of about 20,000 is added to the feed water.

When sea water is evaporated in the same apparatus without the addition of the additive the heat transfer coefficient fell from its initial value to less than 500 B.t.u.'s/sq. ft. hr. ° F. in only 8 hours (see curve B of FIGURE 3).

The use of polyacrylic acids with molecular weights higher than the preferred value of about 20,000 greatly reduces the efficiency of the additive in preventing scale build-up For example, the addition of 3.5 p.p.m. of a polyacrylic acid having a molecular weight of about 110,000, the overall heat transfer coefficient fell from its original value (i.e. about 4000) to a final value of 1750 B.t.u.'s/sq. ft. hr. ° F. in 8 hours; see curve C of FIGURE 3. Higher molecular weight polyacrylic acids allow a greater and even more rapid fall-off in the heat transfer coefficient; see curves D and E of FIGURE 3, which show results obtained for 3.2 and 4.8 p.p.m. respectively of polyacrylyic acid having an estimated molecular weight of about 150,000 to 200,000.

Example III

To illustrate the use of a method in accordance with the present invention for the prevention of scale formation in a climbing film type evaporation apparatus, reference will now be made to FIGURE 2. In this apparatus sea water or the like is pumped from a tank 10, through a preheater 11 and an on-off valve 12 to a vertical evaporator tube 13, which is heated by means of steam in a jacket 14. Evaporation occurs in the tube 13 and the resulting mixture of steam and liquor is separated in a separator 15, the steam 16 being condensed in a condenser or heat exchange equipment to form the distillate. The liquor 17 is run to waste or further evaporated.

Typical results obtained for the evaporation of sea water using the above described apparatus are shown graphically in FIGURE 4.

In the absence of any additive (curve A), the heat transfer coefficient fell from its initial value (i.e. about 4000) to about 600 B.t.u.'s/sq. ft. hr. ° F. after 7½ hours operation. In the same apparatus, evaporation of sea water to which 1 p.p.m. of polyacrylic acid with a molecular weight of about 20,000 had been added, the heat transfer coefficient only fell to 2500 B.t.u.'s/sq. ft. hr. ° F., after 8 hours running; see curve B of FIGURE 4.

In both types of apparatus employed, the method of the invention possesses the advantage that the inner surface of the evaporator remains bright and clean at all times and appears to suffer no corrosion. The filming action of the polyacrylic acid apparently has the effect of excluding corrosive ions from the surface.

Observations have further shown that in the spray evaporation process described above, scale already deposited in parts of the evaporator feed and discharge lines may be removed by treating the feed liquor with polyacrylic acid. Following the addition of the polyacrylic acid to the water being fed to the evaporation plant, collections of pieces of peeled-off, previously deposited scale were observed in discharge lines from the plant. Thus the invention also provides a method of removing existing scale from boilers, evaporators and the like, which comprises operating the said apparatus with feed-liquor which has been treated with a small amount of an organic polymer of the type described, being preferably polyacrylic acid of molecular weight about 20,000.

From the above description, it will be apparent that the invention will make possible a great improvement in the operating efficiency of distillation and like plants. Moreover, the method is simple, can be put into practice without difficulty and does not interfere with the operation of the plant.

We claim:

1. A method of preventing the formation of adherent scale deposits on the heat transfer surfaces of apparatus used for the evaporation of sea water containing concentrations of calcium and magnesium salts which consists of the step of adding a polyacrylic acid having a concentration expressed as the product of the parts per million and the molecular weight of between about 20,000 and about 960,000 to said sea water thus forming a regenerating self-stripping film on said heat transfer surfaces.

2. A method of preventing the formation of adherent scale deposits on the heat transfer surfaces of apparatus used for the evaporation of sea water containing concentrations of calcium and magnesium salts, which consists of the step of adding a polyacrylic acid having a molecular weight of about 20,000 to said sea water thus forming a regenerating self-stripping film on said heat transfer surfaces.

3. A method as claimed in claim 1, wherein the said apparatus is selected from the group consisting of a climbing film evaporator and a spray evaporator.

4. In a method of evaporative distillation of sea water containing concentrations of calcium and magnesium salts, the step of preventing the formation of adherent scale deposits on the heat transfer surfaces of the apparatus used for the evaporation, which consists of the step of adding between 0.5 and 10 parts per million of polyacrylic acid having a molecular weight of about 20,000 to the said water, which step, during operation of the said apparatus, gives rise to the formation of a regenerating self-stripping film on the said surfaces.

5. A method of removing existing scale from the heat transfer surfaces of apparatus used for the evaporation of sea water containing concentrations of calcium and magnesium salts, which consists of the step of adding to the said water of a polyacrylic acid having a molecular weight of about 20,000 which, during operation of the apparatus, gives rise to a regenerating self-stripping film on the said surfaces, which during its self-stripping stage removes the scale.

6. A method of preventing the formation of adherent scale deposits on the heat transfer surfaces of apparatus used for the evaporation of sea water containing concentrations of calcium and magnesium salts which consists of the step of adding a polyacrylic acid having a molecular weight in the range between about 20,000 and about 200,000 to said sea water thus forming a regenerating self-stripping film on said heat transfer surfaces.

References Cited by the Examiner

UNITED STATES PATENTS

| | | | |
|---|---|---|---|
| 2,783,200 | 2/1957 | Crum et al. | 260—80 XR |
| 2,980,610 | 4/1961 | Ruehrwein | 252—180 XR |
| 3,121,626 | 2/1964 | Zarchin. | |

LEON D. ROSDOL, *Primary Examiner.*

JULIUS GREENWALD, ALBERT T. MYERS,
*Examiners.*

W. E. SCHULZ, *Assistant Examiner.*